Dec. 11, 1928.

J. G. JACKSON

STORAGE BATTERY

Filed Jan. 2, 1925

INVENTOR
JOHN G. JACKSON
ATTYS.

Patented Dec. 11, 1928.

1,694,856

UNITED STATES PATENT OFFICE.

JOHN GRANT JACKSON, OF CHATHAM, ONTARIO, CANADA.

STORAGE BATTERY.

Application filed January 2, 1925. Serial No. 254.

My invention relates to improvements in storage batteries and the object of the invention is to devise a battery in which the construction is considerably simplified by doing away with the individual insulating containers.

A further object is to construct a battery utilizing a bipolar electrode in which both the positive and negative plates are combined in one unit and in which such bipolar electrodes constitute the cell division walls.

A still further object is to construct a battery in which plate forming paste materials are used and which are so disposed in the container as to be retained in their active or effective position by gravity and whereby the expansive forces generated in the plate material when functioning shall tend to retain it in place due to the resulting compressive stresses.

Another object is to provide a plastic envelope for the battery in which the conducting cell division walls and insulating cell separators are disposed and which will resist the cumulative expansive forces generated within the plates of the battery, and yet another object is to devise a battery in which the usual metallice terminal connections between the cells are dispensed with.

My invention consists of a storage battery constructed and arranged all as hereinafter more particularly described and illustrated in the accompanying drawing in which.

Like characters of reference indicate corresponding parts in the different views.

Figure 1:
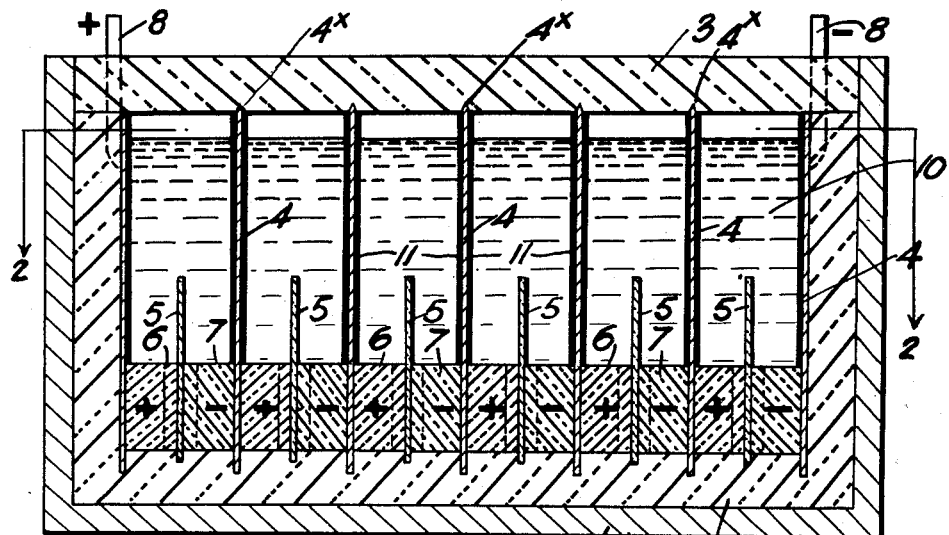
Fig. 1 represents a vertical longitudinal section through a battery constructed according to my invention taken on the line 1—1 (Fig. 2).
Figure 2:
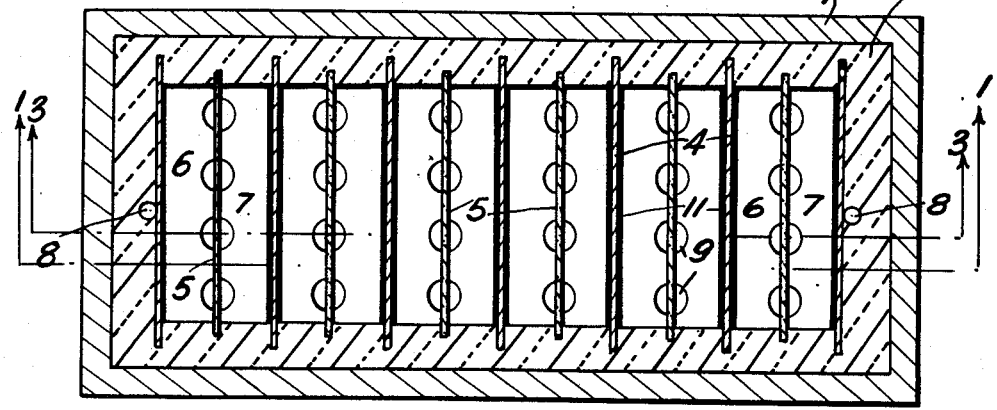
Fig. 2 is a horizontal section on the line 2—2 (Fig. 1)
Figure 3:
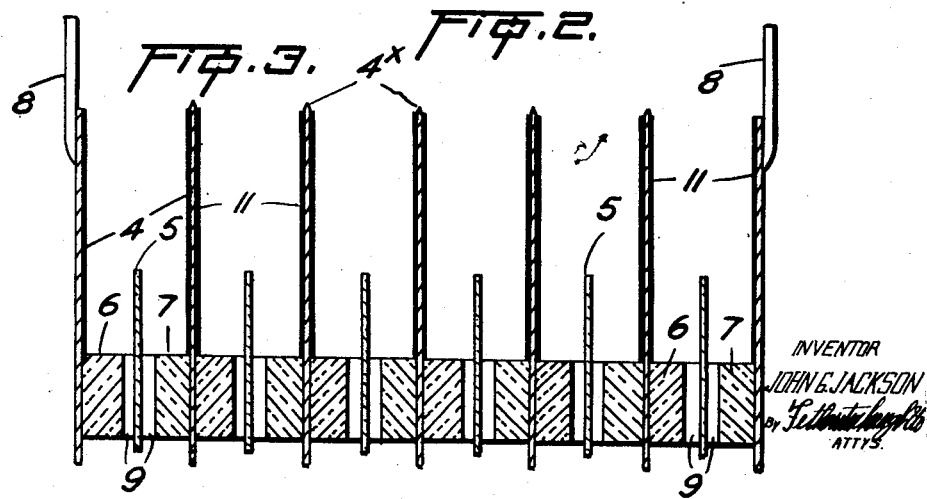
Fig. 3 is a longitudinal section through the assembled conducting cell division walls and cell separators and active plate forming paste material showing the unitary construction of the assembly with the plastic container and outside container removed.

1 is the outside rigid container, and 2 is the inner plastic container provided with the top portion 3. 4 are the conducting cell division walls suitably spaced apart and embedded at their bottom and side edges in the plastic material of the inner container 2, the top knife edges 4ˣ of the walls 4 are embedded in the plastic material of the top 3. 5 are insulating cell separators suitably positioned between the walls 4 and likewise embedded at their bottom and side edges in the plastic material of the inner container 2, said separators preferably being of less height than the walls 4. 6 and 7 is active material introduced between the cell division walls 4, the material on one side of each separator being positive and on the other side negative.

The end walls 4 engage the end walls of the plastic container 2, and are provided with terminals 8 which extend up through the container 2 and through its top 3.

9 are vertical orifices formed in the material 6 and 7 for receiving the electrolyte 10. 11 is insulation covering the exposed faces of the cell division walls 4 above the level of the active paste material 6 and 7.

From the above description it will be seen that I have devised a multi-cell series battery with conducting cell walls connecting the positive and negative active plate material of successive cells in series relation while preventing leakage of electrolyte between cells and also arranged to avoid discharge either around or through the cell division walls. This is accomplished by embedding the extended edge portions of the conducting division walls within the plastic insulating container bottom and side walls and top and by covering with an insulating coating substantially all of the conducting wall surface except such portion as may be in contact with, and covered by the plate forming paste materials of the positive and negative plates. As in this type of battery the positive and negative plates might become short circuited through conducting deposits on the bottom or lower side walls of the interior of the container the insulating cell separators are provided, anchored to or embedded in the bottom and side walls of the plastic container between the positive and negative elements, and extending to such a height within the cell as to prevent the bridging of conducting active or inactive plate materials between positive and negative poles of the individual cells.

While this insulating cell separator may be of porous material, I preferably use a non-porous separator to avoid possible short circuit through conducting deposits formed in the pores and permit the electric circuit through the electrolyte to be formed around the upper edge of the non-porous insulating separators. While the active plate forming paste materials may be caused to adhere to the conducting cell division walls by means of a grid of the same material in the usual manner or retained between the conducting walls and porous cell separators so placed as to retain the active material in contact with the said conducting plates I preferably place the active plate forming paste materials in the pockets or spaces formed at the bottom of the cells between the conducting cell division walls and the common non-porous insulating cell separator in such a manner as to retain the active material in its normal position by gravity and with the further effect that the expansive forces generated within the plate material when functioning within the battery shall tend to retain the plate material by means of the compressive stresses generated thereby instead of causing the active materials to disintegrate due to the effect of the same forces acting upon the plate materials when not so confined and retained.

The plastic container 2 serves not only to seal the embedded edges of the said conducting cell division walls and the insulating cell separators but provides an elastic envelope adapted to resist the cumulative expansive forces generated within the plates of the battery.

What I claim as my invention is:

1. In a storage battery, a cell separator sealed to the insulating bottom and side cell walls and extending above the positive and negative elements, said positive and negative elements abutting against opposed faces of said separator, substantially vertical open ducts being formed within the positive and negative elements at such separator faces in such a manner as to facilitate access of electrolyte into such positive and negative elements.

2. In a multicellular storage battery, a container, cell division walls of conducting material dividing the container into series connected cell sections, active plate material disposed in the lower part of the container between the cell division walls, and superimposed free electrolyte thereabove, the face portions of the cell division walls exposed to the electrolyte being insulated and the face portions presented to the active plate material being uninsulated.

3. In a multicellular storage battery as claimed in claim 2, separators inserted into the cell sections so formed between the cell division walls and extending down through the active plate material.

JOHN GRANT JACKSON.